Sept. 9, 1947.  E. S. TOLMIE  2,427,111
CONVERTER
Filed April 14, 1942
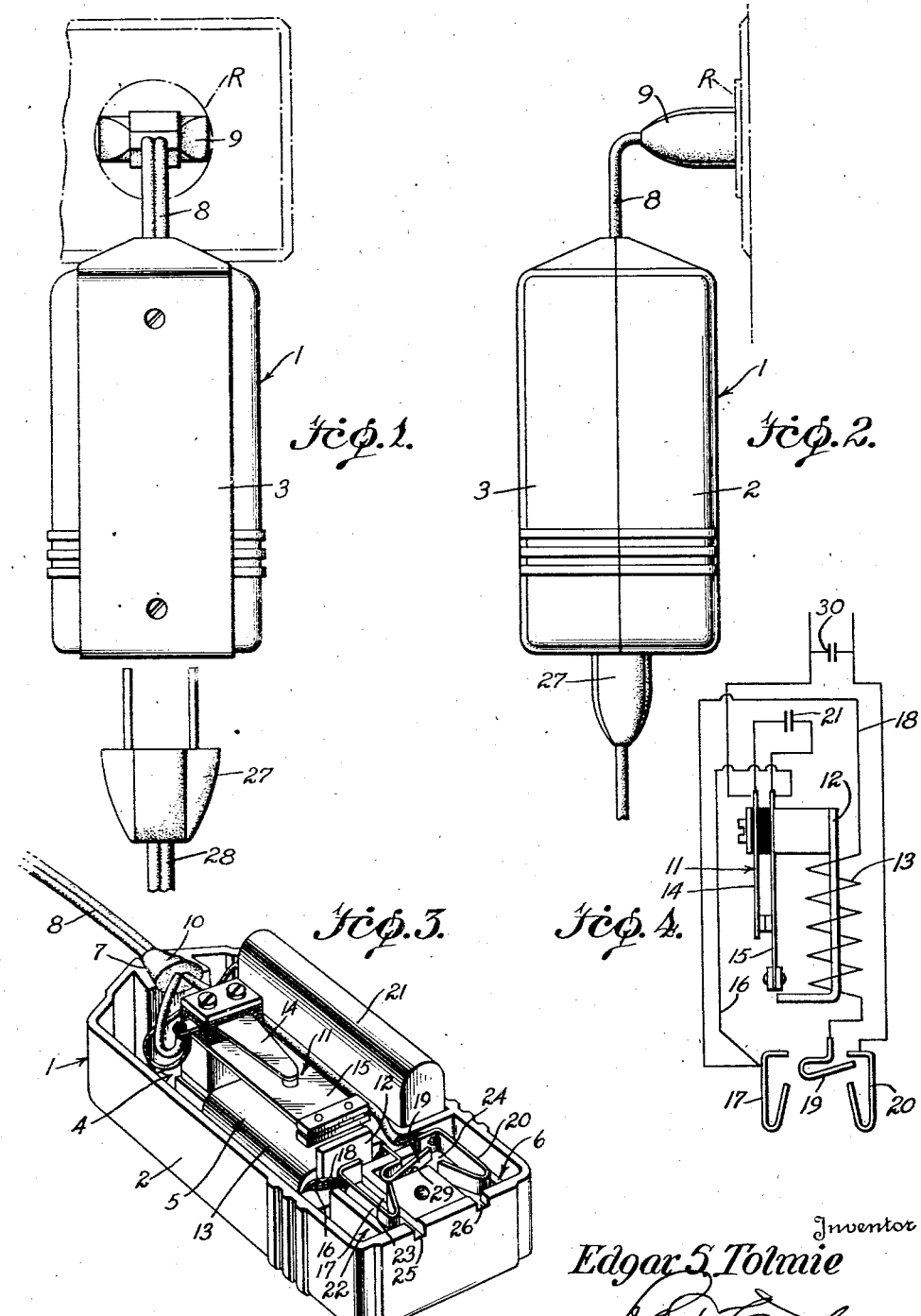
Inventor
Edgar S. Tolmie Patented Sept. 9, 1947

2,427,111

UNITED STATES PATENT OFFICE 2,427,111

CONVERTER

Edgar S. Tolmie, Fairfield, Conn., assignor to Remington Rand Inc., Buffalo, N. Y., a corporation of Delaware Application April 14, 1942, Serial No. 438,915

2 Claims. (Cl. 175—373)

1

This invention relates to converters and particularly to a small portable unit for converting direct current to pulsating current.

The invention comprehends the provision of a small portable converter particularly adapted to be plugged into the commercial plug receptacles of the type used in homes, apartments, offices and the like, so that lamps and various electrical appliances can be plugged into a current supply system. The converter is designed for plugging into a direct current supply circuit for converting the direct current into pulsating current for supply to electrical appliances designed for use only on alternating current. By plugging an alternating current operated appliance such as a shaver, fan or the like into the converter, it may be operated from a direct current supply through the medium of the converter producing a pulsating current, thereby facilitating the use of alternating current operated appliances on direct current supply sources as well as with alternating current.

The invention further comprehends the provision of a converter that can be readily plugged into any plug receptacle and suspended by the plug and connecting cord from the receptacle in order that in the operation of the unit it will be quiet due to its support by the plug and supply cord.

The invention further comprehends the provision of a converter that may be plugged into a plug receptacle having a source of direct current supply with means provided in the converter to normally maintain the converter circuit open so that the converter will not operate until the plug of an alternating current operated appliance is engaged in the plug receptacle of the converter, when the circuit through the converter to the appliance will be completed for securing the operation of the converter to produce a pulsating current for operating the appliance.

The invention further comprehends the provision of a converter that is provided with an automatic circuit controlling means controlled and operated by the insertion of the plug of an alternating current operated appliance, so that the insertion of the plug will actually close the circuit in the converter to secure its operation.

The converter further comprehends the provision of a portable unit structure having a casing formed of complementary sections providing a closed self-contained unit in assembled relation wherein the casing is provided with a compartment for the current converting means and

2 a plug receptacle including circuit control means for the circuits in the converter arranged so the circuit is closed only upon the insertion of the plug on the supply cord of an alternating current operated appliance, while the converter has a plug and supporting cord for attachment to a conventional plug receptacle of a current supply source that provides a suitable supporting means for the entire converter structure. The casing structure provides a means for readily assembling the converting means and plug contacts therein for completely enclosing and housing the same when the casing sections are assembled in position to hold the parts in their assembled relation for normal operation.

In the drawing:

Figure 1 shows the converter in side elevation suspended by its supporting cord from the plug detachably engaged in a conventional current supply plug receptacle, an appliance attachment plug being shown in separated relation relative to the converter preparatory to insertion into the plug receptacle of the converter.

Figure 2 shows the converter in side elevation from a side adjacent the one shown in Fig. 1 with the converter plugged into a conventional plug receptacle and an appliance plug inserted in the plug receptacle of the converter.

Figure 3 shows one of the complementary sections of the converter casing in perspective with the contacts in the plug receptacle and the current converting means mounted in its compartment, the other section of the casing being omitted for convenience in illustrating the structural features of the converter.

Figure 4 shows a wiring diagram of the converter.

A conventional outlet or plug receptacle of a current supply system of the character used in homes, offices and the like, is diagrammatically illustrated and indicated by the letter R.

The converter of the present invention has a casing I formed of two complementary sections 2 and 3 respectively. The sections 2 and 3 are substantial duplicates in construction of one another but oppositely formed for cooperative engagement in complemental relation when assembled with one another. Each section of the casing is formed with a compartment 4 to provide a space for the current converting means generally indicated at 5. The compartment 4 occupies the major portion of the casing while one end of the casing is formed to provide a plug receptacle generally indicated at 6. The casing sections 2 and 3 are open at one side only, the open sides facing each other when the casing sections are assembled to provide a closed casing so that each of the compartments in each casing section cooperates to form complete compartments and provide a compartment for the current converting means and a plug receptacle. These sections are held in assembled relation by a pair of screws inserted through openings in section 3 and screw threaded in sockets in section 2.

The casing sections are preferably molded of suitable plastic material but may be made in any other suitable material. The top portion of each casing section is provided with a tapered groove section 7 for receiving and providing a passage for the supporting and conductor cord 8. The free end of cord 8 is provided with a conventional form of attachment plug 9 having a pair of contact prongs providing input terminals for engagement in a conventional plug receptacle such as that indicated at R in Figs. 1 and 2. Plug 9 is shown in engaged relation with receptacle R in Figs. 1 and 2 illustrating how the converter unit is suspended by supporting a conductor cord 8 from plug 9 and plug receptacle R, in the normal use of the converter in its attached connected relation to a plug receptacle connected with a source of direct current.

A wedge-shaped end member 10 is molded or otherwise attached to the end of supporting and conductor member 8 for engagement in groove 7 and with the inside of casing 1 so as to effectively support casing 1 in suspended relation from conductor 8. The supporting and conductor member 8 includes a pair of wires connected in the source of direct current supply so as to conduct the current from the supply circuit to the converter.

One of the wires of conductor 8 is connected to the vibrator unit 11 of the converting means. Vibrator 11 is suitably attached to core 12 of the converting means. An inductance 13 is wound on core 12 in a manner well-known in the art. Vibrator unit 11 includes a stationary contact 14 and a vibratory armature 15 carrying a contact for normally engaging contact 14. The above-mentioned wire of conductor member 8 is connected with stationary contact 14 of vibrator unit 11, while vibratory armature 15 is electrically connected by a conductor 16 to a spring contact terminal 17 mounted in plug receptacle 6. One end of inductance 13 is also connected to armature 15 through conductor 18 while the opposite end is connected to an auxiliary terminal 19 in plug receptacle 6. Another terminal 20 in plug receptacle 6 is electrically connected to the other wire in conductor member 8.

A condenser 21 is mounted in casing 1 in the manner shown in Fig. 3 and is electrically connected to contact 14 and vibrator 15 to reduce the arcing at the points during the vibration of armature 15 in the operation of the converter.

Plug receptacle 6 is molded as an integral part of casing sections 2 and 3 in the form of a solid molded body 22 having a pair of spaced parallel recesses 23 and 24 of duplicate but opposite form in spaced parallel relation. Each recess 23 and 24 receives the output terminals 17 and 20 respectively, for slidable mounting in the recesses in both sections of the casing so that these terminals are completely housed and held in position when both sections of the casing are in assembled relation. These terminals remain in the recesses in section 3 when section 2 is removed. Apertures 25 and 26 extend through the bottom end wall of the casing having a portion formed in each section in complementary registering relation to provide the passage for the prongs of a conventional plug 27 carried by supply cord 28 of an alternating current operated appliance.

Plug receptacle 6 is also formed with recess 29 extending laterally from recess 24 and communicating with the inner end thereof in the manner shown in Fig. 3, for housing terminal 19 in a position so that the free end of terminal 19 will be in aligned relation in recess 24 with plug opening 26 but not in a position to normally contact any part of terminal 20. However, the arrangement of terminals 19 and 20 is such that upon the insertion of plug 27 into plug receptacle 6, one of the prongs of plug 27 will first engage terminal 20. Then, upon further insertion into the plug receptacle the plug prongs will engage the free end of terminal 19 and thereby act as a switching or connecting element to establish an electrical circuit between terminals 19 and 20 for closing the circuit from one side of the direct current source of supply through inductance 13 to the other side of the circuit connected with terminal 20. At the same time as plug 27 is inserted into receptacle 6 the circuit is also made between the other prong of plug 27 and terminal 17 to thereby connect the alternating current operated electrical appliance in circuit with the converter by contact with terminals 17 and 20.

As soon as contact is made with terminal 19 the circuit is closed so that direct current will then energize inductance 13 which operates vibrator 15 to draw it away from contact 14 to open the circuit. As soon as the circuit is open inductance 13 is de-energized and armature 15 will return to its original position re-establishing the circuit through contact 14. This opening and closing of the direct current circuit will thereby supply a pulsating current to plug 17 and supply cord 28 for the alternating current operated appliance for thereby operating such appliance.

A condenser 30 shown diagrammatically in Fig. 4 may be connected across the direct current supply circuit within casing 1 where the supporting cord is connected to the converting means to cooperate in eliminating radio interference caused by the operation of the vibrator.

The present converter is particularly designed for use with vibrator type electric shavers designed for operation on alternating current. A small portable converter unit is provided that may be readily transported from place to place, packed in a traveling bag or other case along with a shaver so as to be readily usable in any direct current circuit for the operation of an alternating current vibrator type shaver. This device will also operate other types of alternating current operated appliances such as massage vibrators, small electric fans and other similar appliances that could not otherwise be operated from direct current sources of supply.

In using the present converter the plug 9 is inserted in a conventional plug receptacle R as shown in Figs. 1 and 2 for connecting the converter in circuit with a direct current supply circuit. In this connected position the casing 1 containing the converter means in a completely housed condition as illustrated, is suspended in pendant relation from plug 9 in a manner that it will not touch the wall or adjacent objects of the building. As a result of this pendant suspension of the converter casing 1 from plug 9 on its supply and supporting cord 8, the noise created by the operation of the vibrator will not be transmitted to adjacent objects and, therefore, will not be amplified. As a result, the operation of the vibrator will be very quiet when the converter is in use.

The converter may be left plugged into the direct circuit at all times in view of the fact that terminals 17, 19 and 20 are arranged in such a manner that they control the circuit to the converter and the direct current supply circuit or source in order that the circuit to the converter will remain open with the converting means de-energized until a desired alternating current operated appliance is plugged into the converter. In plugging the plug 27 on the supply cord for the appliance into the converter, the prongs of the plugs not only close the circuit of the appliance with the converter and supply circuit but also close the circuit to the converting means to secure the operation of the vibrator for converting direct current into pulsating current for the operation of the alternating current appliance. This closing of the circuit is automatic by the insertion of the plug into socket 6 for engagement with terminals 17, 19 and 20. When the plug is removed the circuit is automatically opened by the removal operation. In this way the plug becomes an automatic controlling means for securing the operation of the converter only when it is desired to operate an appliance therefrom.

The current converting means is mounted in section 3 of the casing in a manner to provide ready accessibility to the parts upon removal of the section 2 therefrom. However, when section 2 is removed from section 3 of the casing, the parts of the current converting means can be inspected and the operation observed for testing and adjustment purposes or in case replacements are necessary. This provides a very convenient, simple and economical converter construction for converting direct current to pulsating current.

It will be further noted from the wiring diagram in Fig. 4 that the load placed upon the circuit by the appliance is not carried by the converting means, that is, through inductance 13 of the converting means. The converter is so constructed and the circuits are arranged to include inductance 13 in an auxiliary or shunt circuit connected with the direct current supply source independently of the circuit to a connected appliance. In this way inductance 13 operates to interrupt a supply of current to the appliance from the direct current source through the make and break of the contact mechanism so as to pulsate the supply of current to the appliance. This enables the use of an inductance consuming only a small amount of current and designed to supply only sufficient magnetic pull upon the armature 15 of the vibrator to secure its operation.

The invention claimed is:

1. A portable direct to pulsating current converter comprising a casing, a direct to pulsating current converting means enclosed within said casing, means for connecting said converting means to a source of direct current, a plug receptacle formed in said casing for detachably receiving an alternating current operated appliance carried plug, a pair of contacts forming part of said plug receptacle connecting said appliance in circuit with said first mentioned means, and another contact contained in a shunt circuit in said converting means for engagement and operation by said appliance plug for closing the circuit between said converting means, direct current source and appliance for supplying said appliance with pulsating current for the operation thereof.

2. A portable direct to pulsating current converter comprising a casing, a direct to pulsating current converting means enclosed within said casing, including a pair of conductors for connecting said means to a source of direct current, one of said conductors being attached to a vibrator contact of said means, a plug receptacle for receiving a two prong plug of an alternating current operated appliance, three contacts in said receptacle, one for engagement with one prong of said plug and the other two for engagement by the other prong of said plug, said last-mentioned contacts normally being in disengaged relation to each other, a conductor connecting the first-mentioned of said three contacts with a vibrator contact to provide a direct circuit with the aforementioned one of said first conductors through said vibrator contacts, the other of said first-mentioned conductors having direct connection to one of said other two of said last-mentioned contacts, and said converting means having an inductance provided with a shunt circuit connection at one end with the other of said last-mentioned other two contacts and at the other end with the last-mentioned vibrator contact, whereby said converting means has the shunt circuit thereto completed only when the plug of said appliance is engaged in said plug receptacle with said three contacts whereupon said converting means will operate to convert direct current directly supplied through said contacts to said alternating current appliance into pulsating current for operating said appliance without being affected by the voltage drop across said inductance.

EDGAR S. TOLMIE.

REFERENCES CITED

The following references are of record in the file of this patent:

UNITED STATES PATENTS

| Number | Name | Date |
|---|---|---|
| 2,288,449 | Hanley | June 30, 1942 |
| 2,120,126 | Cole | June 7, 1938 |
| 2,267,260 | Alexander et al. | Dec. 23, 1941 |
| 2,071,384 | Barrett | Feb. 23, 1937 |